US010094719B2

(12) United States Patent
Sale et al.

(10) Patent No.: US 10,094,719 B2
(45) Date of Patent: Oct. 9, 2018

(54) DEVICES AND METHODS FOR MEASURING THERMAL FLUX AND ESTIMATING RATE OF CHANGE OF REACTIVE MATERIAL WITHIN A SUBSURFACE FORMATION

(71) Applicants: Colorado State University Research Foundation, Fort Collins, CO (US); GSI Environmental, Inc., Houston, TX (US)

(72) Inventors: Thomas C. Sale, Bellvue, CO (US); Emily B. Stockwell, Fort Collins, CO (US); Charles J. Newell, Houston, TX (US); Poonam R. Kulkarni, Houston, TX (US)

(73) Assignees: GSI Environmental, Inc., Houston, TX (US); Colorado State University Research Foundation, Fort Collins, CO (US)

( * ) Notice: Subject to any disclaimer, the term of this patent is extended or adjusted under 35 U.S.C. 154(b) by 430 days.

(21) Appl. No.: 14/625,570

(22) Filed: Feb. 18, 2015

(65) Prior Publication Data
US 2015/0233773 A1    Aug. 20, 2015

Related U.S. Application Data

(60) Provisional application No. 61/941,194, filed on Feb. 18, 2014.

(51) Int. Cl.
*G01K 1/02* (2006.01)
*G01K 17/08* (2006.01)
(Continued)

(52) U.S. Cl.
CPC ............ *G01K 17/08* (2013.01); *E21B 47/065* (2013.01); *G01K 1/026* (2013.01); *G01V 9/005* (2013.01)

(58) Field of Classification Search
CPC ........ E21B 47/065; E21B 47/10; E21B 47/00; E21B 47/1005; G01K 1/026; G01K 17/08; G01V 9/005
See application file for complete search history.

(56) References Cited

U.S. PATENT DOCUMENTS

| 2,933,923 | A | * | 4/1960 | Milochik | ................. | G01V 5/06 |
| | | | | | | 250/253 |
| 3,217,550 | A | * | 11/1965 | Birman | .................. | G01V 9/005 |
| | | | | | | 374/136 |

(Continued)

OTHER PUBLICATIONS

Heuckeroth, Deborah M. et al., *Calculation of Biodegradation Rate Constants Based on Soil Temperatures*, In Situ and On-Site Bioremediation: vol. 2, Papers from the Fourth International In Situ and On-Site Bioremediation Symposium New Orleans, Apr. 28-May 1, 1997.

(Continued)

*Primary Examiner* — Randy Gibson
(74) *Attorney, Agent, or Firm* — The Petruzzi Law Firm; James D. Petruzzi

(57) ABSTRACT

Devices and methods for measuring subsurface thermal fluxes and for estimating a rate of change in the amount of a reactive material within a subsurface formation using the measured thermal fluxes are described herein. The methods of measuring subsurface thermal fluxes may use at least one array of temperature sensors distributed along a vertical transect projecting from the surface and into the subsurface of a region of interest. Methods of estimating a rate of change in the amount of a reactive material within a portion of the region of interest based on perturbations of the thermal profile within the subsurface due to an endothermic or exothermic degradation of the reactive material within the portion of the region of interest are also described herein.

20 Claims, 9 Drawing Sheets

(51) Int. Cl.
*G01V 9/00* (2006.01)
*E21B 47/06* (2012.01)

(56) References Cited

U.S. PATENT DOCUMENTS

| | | | | | |
|---|---|---|---|---|---|
| 3,714,832 | A * | 2/1973 | Howell | ............... | G01V 9/005 |
| | | | | | 374/136 |
| 3,808,889 | A * | 5/1974 | Rawson | ............... | E21B 47/065 |
| | | | | | 374/134 |
| 3,874,232 | A * | 4/1975 | Hardison | ............. | E21B 47/065 |
| | | | | | 374/134 |
| 3,880,234 | A * | 4/1975 | Showalter | ............ | E21B 43/243 |
| | | | | | 374/136 |
| 3,919,398 | A * | 11/1975 | Davis | ................. | C01B 7/093 |
| | | | | | 423/481 |
| 4,313,342 | A * | 2/1982 | Poppendiek | ......... | E21B 47/065 |
| | | | | | 374/29 |
| 4,353,249 | A * | 10/1982 | Lagus | ................ | E21B 47/10 |
| | | | | | 73/152.31 |
| 4,420,974 | A * | 12/1983 | Lord | ................. | E21B 47/065 |
| | | | | | 338/25 |
| 4,676,664 | A * | 6/1987 | Anderson | ............ | E21B 47/065 |
| | | | | | 374/136 |
| 5,121,993 | A * | 6/1992 | Carrigan | ............. | E21B 47/065 |
| | | | | | 374/136 |
| 5,321,612 | A * | 6/1994 | Stewart | ............... | G01V 1/00 |
| | | | | | 374/136 |
| 5,353,873 | A * | 10/1994 | Cooke, Jr. | .......... | E21B 47/1005 |
| | | | | | 166/64 |
| 6,305,944 | B1 * | 10/2001 | Henry | ................ | E21B 17/01 |
| | | | | | 439/13 |
| 6,677,861 | B1 * | 1/2004 | Henry | ................ | E21B 17/01 |
| | | | | | 166/250.01 |
| 7,281,435 | B2 * | 10/2007 | Sale | ..................... | B09C 1/00 |
| | | | | | 73/861.07 |
| 7,861,601 | B2 * | 1/2011 | Sale | ..................... | B09C 1/00 |
| | | | | | 73/861.07 |
| 2007/0113676 | A1 * | 5/2007 | Sale | ..................... | B09C 1/00 |
| | | | | | 73/861.07 |
| 2009/0223303 | A1 * | 9/2009 | Sale | ..................... | B09C 1/00 |
| | | | | | 73/861.07 |
| 2009/0262781 | A1 * | 10/2009 | Shumaker | .............. | G01K 1/08 |
| | | | | | 374/141 |
| 2012/0158307 | A1 * | 6/2012 | Jay | ..................... | E21B 47/065 |
| | | | | | 702/11 |
| 2015/0300163 | A1 * | 10/2015 | Tips | ..................... | E21B 49/08 |
| | | | | | 73/152.42 |
| 2016/0230531 | A1 * | 8/2016 | Wood | ................. | E21B 47/10 |

OTHER PUBLICATIONS

Kurzanski, Paul J. et al., *Evaluation of Natural Sourze Zone Depletion Using Temperature and Carbon Dioxide Flux: A Case Study*, Railroad Environmental Conference, Nov. 6, 2013.

Sweeney, Robert E. et al., *Temperature as a Tool to Evaluate Aerobic Biodegradation in Hydrocarbon Contaminated Soil*, Groundwater Monitoring & Remediation 34, No. 3/Summer 2014/pp. 41-50.

\* cited by examiner

DEVICES AND METHODS FOR MEASURING THERMAL FLUX AND ESTIMATING RATE OF CHANGE OF REACTIVE MATERIAL WITHIN A SUBSURFACE FORMATION

CROSS REFERENCE TO RELATED APPLICATION

This application claims priority from U.S. provisional patent application Ser. No. 61/941,194, entitled "Subsurface Thermal Flux Tools" filed on Feb. 18, 2014, the entirety of which is incorporated by reference herein.

FIELD OF THE INVENTION

This application relates to devices and methods for measuring subsurface thermal fluxes and for estimating rates of changes of the amount of reactive material within a subsurface formation using the measured thermal fluxes. In particular, this application relates to methods of measuring subsurface thermal fluxes using at least one array of temperature sensors distributed along a vertical transect extending from the surface and into the subsurface of a region of interest. This application further relates to methods of estimating a rate of change in an amount of a reactive material within a portion of the region of interest based on perturbations of the thermal profile within the subsurface due to an endothermic or exothermic reactions of the reactive material within the portion of the region of interest.

BACKGROUND OF THE INVENTION

An ongoing environmental challenge is managing the legacy of anthropogenic activities that have resulted in the contamination of groundwater, surface water, soil, and/or soil gas via subsurface source zones. Source zones may be defined as saturated or unsaturated subsurface regions containing hazardous substances, pollutants, or reactive materials that may act as reservoirs that sustain a reactive material plume in groundwater, surface water, or air or may act as sources for direct exposure. These source zones may include sorbed and aqueous-phase reactive materials as well as non-aqueous reactive materials such as solids or non-aqueous phase liquids (NAPLs).

The identification and cleanup of source zones may be difficult due to heterogeneity within the subsurface formations in the form of spatial variations in permeability and porosity that may result in the sparse distribution of the reactive materials within the subsurface formations. As a result, locating regions within source zones that require treatment is difficult. Furthermore, monitoring the reactive materials within source zones and the effect of remedial agents on reactive materials within source zones is challenging due to the relative inaccessibility of these subsurface formations, which may extend well over about 30 feet below ground surface.

The monitoring of reactive materials introduced into preexisting subsurface formations poses an ongoing challenge for the environmental management of various industrial facilities as well as waste collection, processing, and storage facilities. Existing monitoring methods may exploit the microbially-mediated biodegradation of organic reactive materials, which may produce carbon dioxide and heat within a contaminated region of the subsurface formation. These existing methods, such as the Licor Trap Method or the $CO_2$ Trap Method, estimate reactive material loss rates using measured efflux of $CO_2$ above contaminated subsurface formations, assuming that the amount of $CO_2$ measured is directly related to the reactive material loss rate resulting from biodegradation. These $CO_2$-based methods provide estimates based on a small area over a short period of time, but are less effective at providing the long-term monitoring capability needed to assess ongoing contamination events or to assess the effectiveness of remediation of the contaminated subsurface formation. Chimneying, ground surface cover, heterogeneities in the soil, and short or long term climatic events may cause a large variability in reactive material loss rates estimated using these existing methods. Further, inorganic reactive materials, such as aluminum, may not be compatible with these existing methods because the degradation reactions within the contaminated subsurface formations may not produce $CO_2$.

A need exists for a robust method for monitoring the rate of change of an amount of reactive material within a subsurface formation using measurements that are compatible with a wide variety of potential reactive materials. Such a method may be used to monitor the degree of contamination of a subsurface formation, to detect the introduction of additional reactive materials into the formation, to assess the rate of degradation of the reactive materials, and to assess the effectiveness of remediation of the contaminated subsurface formation.

SUMMARY OF THE INVENTION

In an aspect, a method for detecting a rate of change of an amount of a reaction material within a subsurface formation may include monitoring at least one thermal parameter at one or more positions within the subsurface formation; removing the effects of non-reaction material energy sources or sinks from the at least one thermal parameter to obtain at least one corrected thermal parameter; calculating one or more energy fluxes using the at least one corrected thermal parameter according to a plurality of energy transfer rules; calculating a net rate of energy change produced by the endothermic reaction or the exothermic reaction of the reaction material within the subsurface formation by combining the one or more energy fluxes; and converting the net rate of energy change into the rate of change of the amount of the reaction material according to a reaction rule representing the endothermic reaction or the exothermic reaction of the reaction material within the subsurface formation. The reaction material may undergo an endothermic reaction or an exothermic reaction within the subsurface formation. The at least one thermal parameter may include a temperature or a thermal flux.

In another aspect, the method may further include monitoring the rate of change in the amount of the reaction material and reporting a new release of the reaction material into the formation if the rate of change in the amount of the reaction material exceeds a threshold value. The method may further include monitoring the rate of change in the amount of the reaction material after initiation of a site remedy to monitor the effectiveness of the site remedy. The method may further include integrating the rate of change in the amount of the reaction material to calculate a cumulative change in the amount of the reaction material within the subsurface formation.

In an aspect, the one or more positions may include at least two positions separated by a vertical separation distance, a horizontal separation distance, or any combination thereof. In this aspect, the at least one thermal parameter may include at least five temperatures from at least five vertical positions along a vertical transect through the subsurface formation. The at least five vertical positions may include a first position near ground or top surface; a second position between the first position and a region including reactive material of the subsurface formation; a third position within the region including reactive material of the subsurface formation; a fourth position below the region including reactive material of the subsurface formation; and a fifth position between the fourth position and the region including reactive material of the subsurface formation. The at least one corrected thermal parameter is obtained by subtracting at least one background thermal parameter from the at least one thermal parameter at each corresponding position, and each background thermal parameter may include a representation of a thermal parameter within a reactive material-free region from the subsurface formation matched to one position of one thermal parameter. The at least one background thermal parameter is obtained by measuring the at least one background thermal parameter within a reactive material-free region situated near the region including reactive material of the subsurface formation or estimating the at least one background thermal parameter using a theoretical model of subsurface thermal parameters.

In another aspect, the plurality of energy transfer rules may include a heating rule used to calculate the rate of change of energy within the region including reactive material of the subsurface formation associated with temperature changes; a sensible heat conduction rule used to calculate a conductive heat flux from the subsurface formation via an amount of substrate adjacent to the region including reactive material of the subsurface formation; a sensible heat convection rule used to calculate convective heat flux via water flowing through the subsurface formation; a latent heat transfer rule used to calculate a latent heat flux from the subsurface formation via a movement of water vapor through the subsurface formation; or any combination thereof. The reaction rule used to convert the net rate of energy change into the rate of change of the amount of the reactive material may include dividing the net rate of energy change by an enthalpy change of the reaction of the reactive material within the subsurface formation.

In yet another aspect, a method for detecting a rate of change of an amount of a reactive material within a subsurface formation may include monitoring a plurality of site temperatures from at least five positions along a vertical transect passing through the subsurface formation; calculating a plurality of corrected temperatures by subtracting a plurality of background temperatures from the plurality of site temperatures at each of the at least five vertical positions; calculating a net rate of energy change produced by the endothermic reaction or the exothermic reaction of the reactive material within the subsurface formation by adding one or more energy fluxes; and calculating the rate of change of the amount of the reactive material within the subsurface formation by dividing the net rate of energy change by a change in enthalpy associated with the exothermic or endothermic reaction of the reactive material within the subsurface formation. The reactive material undergoes an endothermic reaction or an exothermic reaction within the subsurface formation. The at least five vertical positions may include a first position situated near ground or top surface; a second position situated between the first position and a region including the reactive material of the subsurface formation; a third position situated within the region including the reactive material of the subsurface formation; a fourth position situated below the region including the reactive material of the subsurface formation; and a fifth position situated between the fourth position and the region including reactive material of the subsurface formation. Each of the plurality of background temperatures may include a representation of a temperature from a vertical position within a reactive material-free region. The one or more energy fluxes may include a rate of change of energy within the region including the reactive material of the subsurface formation associated with temperature changes; a conductive heat flux from the region including the reactive material of the subsurface formation via an amount of substrate adjacent to the region; and a convective heat flux via water flowing through the region including the reactive material of the subsurface formation.

In this aspect, the plurality of background temperatures may be obtained by measuring the background temperatures along a second vertical transect within a reactive material-free region of the subsurface formation situated near the first vertical transect or estimating the background temperatures using a theoretical model of subsurface temperatures. The method may further include calculating the rate of change of energy associated with temperature changes within the region including the reactive material subsurface formation by multiplying a rate of change of the corrected temperature at the third position by a vertical thickness of the region including the reactive material subsurface formation and by a volumetric heat capacity representative of the soil within the subsurface formation. The method may further include calculating the vertical conductive heat flux using the corrected temperatures by calculating an upper thermal gradient by dividing a first differential between the corrected temperatures at the first and second positions by a first vertical separation distance between the first and second positions; calculating an upper conductive heat flux by multiplying the upper thermal gradient by a first thermal conductivity representative of the soil above the subsurface formation; calculating a lower thermal gradient by dividing a second differential between the corrected temperatures at the fourth and fifth positions by a second vertical separation distance between the fourth and fifth positions; and calculating a lower conductive heat flux by multiplying the lower thermal gradient by a second thermal conductivity representative of the soil below the subsurface formation.

In another aspect, the method may further include monitoring groundwater levels along the vertical transect to measure a vertical water flux flowing through the subsurface formation. In this aspect, the method may further include calculating a vertical convective heat flux by multiplying a third differential between the corrected temperatures at the second and fifth positions by the vertical water flux and by the volumetric heat capacity of water. The conductive heat flux may include a vertical conductive heat flux, a horizontal conductive heat flux, a lateral conductive heat flux mutually perpendicular to the vertical and horizontal conductive heat fluxes, and any combination thereof. The convective heat flux may include a vertical convective heat flux, a horizontal convective heat flux, a lateral convective heat flux mutually perpendicular to the vertical and horizontal convective heat fluxes, and any combination thereof.

In yet another aspect, the reactive material may be a light non-aqueous phase liquid (LNAPL) including at least one hydrocarbon. In certain embodiments, the endothermic or exothermic reaction may be a microbial biodegradation of the at least one hydrocarbon of the LNAPL. The change in enthalpy may be calculated by calculating a stoichiometric change in entropy, a stoichiometric change in enthalpy and a stoichiometric change in free energy for one or more reduction-oxidation reactions associated with the microbial biodegradation; and calculating the change in enthalpy by multiplying the stoichiometric change in enthalpy by an energy transfer efficiency. The change in enthalpy may include the proportion of the stoichiometric change in enthalpy released as heat during the microbial biodegradation. The one or more reduction-oxidation reactions associated with the microbial biodegradation may include aerobic respiration, denitrification, manganese reduction, iron reduction, sulfate reduction, nitrate reduction, methanogenesis, or any combination thereof.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The following figures illustrate various aspects of the disclosure.

Corresponding reference characters indicate corresponding elements among the views of the drawings. The headings used in the figures should not be interpreted to limit the scope of the claims.

DETAILED DESCRIPTION

Figure 1:
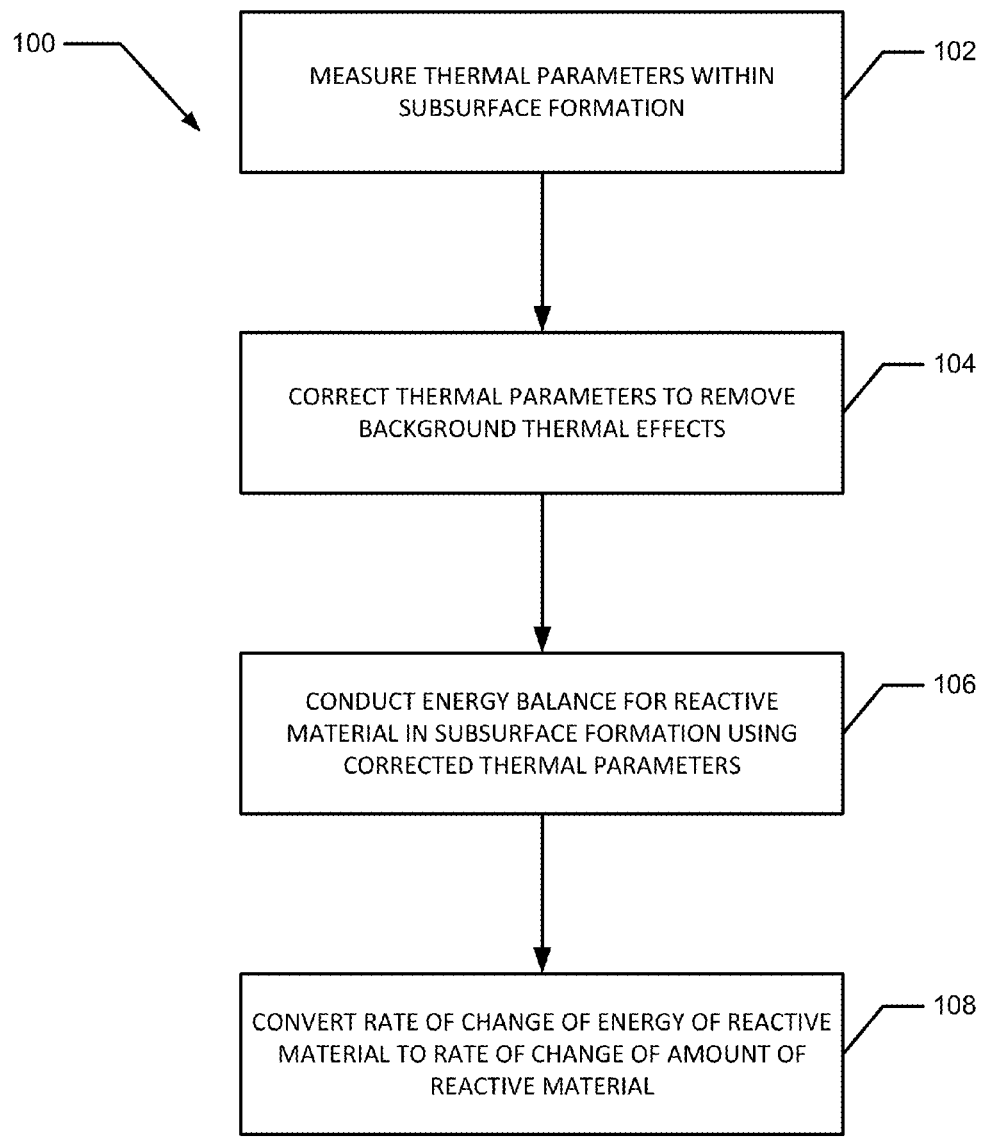
FIG. 1 is a block diagram summarizing a method 100 for monitoring a rate of change in an amount of a reactive material within a subsurface formation.

In various aspects, the present disclosure provides systems and methods for measuring a rate of change in an amount of a reactive material within a subsurface formation using measurements of thermal parameters at one or more positions within the formation. These systems and methods may measure thermal parameters including, but not limited to, thermal gradients and/or temperatures at one or more positions within the subsurface formation. The measured thermal parameters may be used to perform an energy balance to determine the heat generated by the degradation of the reactive material. The method may then convert the heat generated by the degradation of the reactive material to a rate of change in the amount of reactive material within the subsurface formation using the known change in enthalpy for the degradation reactions known to break down the reactive materials within the subsurface formation.

It was discovered unexpectedly that when the thermal parameters measured by the systems disclosed herein were corrected to remove the effects of other thermal sources and sinks within the subsurface formation, the energy balance resulting from the corrected thermal parameters provided consistently accurate measurements of the rate of change of the amount of reactive materials within the subsurface formation. Non-limiting examples of the thermal sources and sinks that may impact the thermal parameters measured using the systems disclosed herein include: geothermal heat sources, solar radiation at ground level, daily variations in air temperature at ground level, and seasonal variations in air temperature at ground level.

The systems and methods described herein overcome many of the limitations of existing methods of monitoring the rate of degradation of a reactive material within a subsurface formation. Measurements of thermal parameters are inherently less prone to variability introduced by site-specific artifacts including, but not limited to, ground cover or seasonal climate variations. The thermal parameters may be measured continuously over extended periods of time, thereby enabling long-term monitoring of degradation rates or assessment of the effectiveness of remediation of the reactive material subsurface formation with any desired degree of temporal resolution. Significantly, the thermal measurements are especially robust compared to existing methods because the rate of change of energy within the region including the reactive material may result from a wide variety of reactions of reactive materials that result in any sort of thermal signature within the subsurface formation.

In one aspect, the measured thermal parameters may capture the effect of exothermic degradation reactions including, but not limited to: heat-generating biodegradation of organic reactive materials such as hydrocarbons, oxidation of inorganic reactive materials including metals, and radioactive decay of radioactive materials. In another aspect, the measured thermal parameters may capture the effect of endothermic reactions including, but not limited to, the evaporation of volatile reactive materials within the subsurface formation. In various aspects, the systems and methods disclosed herein may monitor the rate of change of the amount of any reactive materials which undergoes any reaction within the subsurface formation that results in any change in temperature including but not limited to heat-generating exothermic reactions and heat-absorbing endothermic reactions.

In various other aspects, a thermal monitoring system may be used to obtain the measurements of thermal parameters for at least one position within the subsurface formation. In various aspects, the thermal monitoring system may enable a one-dimensional, two-dimensional, or three-dimensional energy balance for the reactive material subsurface formation. In one aspect, the measurements of the thermal parameters may be obtained along a linear transect, resulting in a one-dimensional characterization of the thermal parameters within the reactive material subsurface formation. By way of non-limiting example, thermal parameters may be measured along a vertical transect to provide a characterization of the thermal parameters as a function of depth below ground surface of the formation (or the top surface of the formation, if the surface extends above ground, e.g., as with a landfill or compositing site). In another aspect, the measurements of the thermal parameters may be obtained within a planar array, resulting in a two-dimensional characterization of the thermal parameters within the reactive material subsurface formation. By way of non-limiting example, thermal parameters may be measured along two vertical transects separated laterally, thereby providing a characterization of the thermal properties as a function of depth below ground or top surface of the formation and as a function of the horizontal distance in the plane defined by the two vertical transects. By way of yet another non-limiting example, thermal parameters may be measured along three non-coplanar transects, thereby providing a three-dimensional characterization of the thermal properties within the reactive material subsurface formation.

Additional descriptions of the systems and methods for monitoring the rate of change of an amount of a reactive material within a subsurface formation are provided herein below.

I. Method for Monitoring Rate of Change of Amount of Reactive Material in a Subsurface Formation The method of the present disclosure in various aspects may be used to monitor changes in the amount of a reactive material within a subsurface formation using measured thermal parameters including, but not limited to, thermal gradient and temperature within the subsurface formation. "Subsurface formation", as used herein, refers to any local region including a ground or top surface area and a volume of substrate situated vertically beneath the exposed ground or top surface. In various aspects, the subsurface formation may include a substrate or porous media including, but not limited to, soil, sand, clay, porous rock, non-porous rock, man-made substrates such as asphalt or concrete, and any combination thereof. In various other aspects, the substrate of subsurface formation may further include water at various saturation levels ranging from relatively dry substrate to completely saturated substrate including, but not limited to groundwater. The subsurface formation may further include various organisms including, but not limited to, bacteria, fungi, plant roots, and burrows of larger organisms including, but not limited to: insect larvae, adult insects such as ants, amphibians such as frogs or salamanders, reptiles such as snakes or lizards, and mammals such as mice, rabbits, or moles.

FIG. 1 is a block diagram summarizing a method 100 for monitoring a rate of change in an amount of a reactive material within a subsurface formation. In various aspects, the method obtains measurements of one or more thermal parameters at one or more positions within the subsurface formation at step 102. The measured thermal parameters are corrected to remove the effects of background thermal sources and sinks within the subsurface formation not related to the endothermic or exothermic reaction of the reactive material at step 104. The corrected thermal parameters measured in this method provide sufficient information to conduct an energy balance at step 106 that characterizes the rate of change of energy within a region including the reactive material of the subsurface formation. The rate of change of energy within the region including the reactive material may be converted to a rate of change of the amount of reactive material within the subsurface formation at step 108.

Additional descriptions of the method 100 are provided herein below.

A) Measure Thermal Parameters

Referring again to FIG. 1, the method 100 includes obtaining measurements of at least one thermal parameter for at least one position within the subsurface formation at step 102. In various aspects, the thermal parameters may include parameters to be used in the energy balance conducted at step 106. As described herein below, the energy balance accounts for the generation or absorption of energy within the region including the reactive material of the subsurface formation, as well as the transport of energy in and out of the region including the reactive material by way of known energy transport mechanisms including, but not limited to, conduction and convection.

The rate of change in energy within the region including the reactive material may be calculated using a measured rate of change of the temperature within the region including the reactive material, as described in detail herein below. In one aspect, the method 100 may measure temperature within the region including the reactive material over a predetermined time interval at step 102, and the time history of the measured temperature may be processed using known methods to calculate the rate of change in temperature. The temperature measurement may be performed using any suitable temperature sensor described in detail herein below. In another aspect, temperatures at two or more locations within the region including the reactive material may be obtained over a predetermined time interval. In this other aspect, any known data analysis method may be used to combine the measured temperatures at the at least two positions including, but not limited to: averaging the temperatures measured at the two or more locations at each time point; selecting the highest or lowest temperature at each time point, or selecting the time history of the position having the highest or lowest average temperature may be selected for use.

Conductive heat flow may be assessed using temperature gradients measured within the region of the subsurface formation adjacent to the region including the reactive material as described herein below. In various aspects, the temperature gradients may be measured in any one or more directions including, but not limited to: vertical; horizontal including left/right and/or north/south/east/west; and any combination thereof. In one aspect, the temperature gradient may be measured directly using a temperature gradient sensor as described herein below. In another aspect, the temperature gradient may be assessed by obtaining temperature measurements at two or more positions along a desired direction described herein above. In this other aspect, the magnitude of the temperature gradient may be calculated by dividing the difference in temperature between the two or more positions by the separation distance between the two or more positions. By way of non-limiting example, two temperature sensors positioned at two positions along a vertical transect may be positions within the region of the subsurface formation situated vertically above a region including the reactive material to measure the temperature gradient above the region including the reactive material.

In various other aspects, additional measurements of other characteristics of the subsurface formation may be obtained for use in the energy balance. Non-limiting examples of suitable additional measurements include: ground water level; % water saturation at one or more positions; water flow rate; thermal conductance of the substrate within the subsurface formation, heat capacity of the substrate within the subsurface formation, and any other suitable characteristics of the subsurface formation used in the energy balance calculations as described herein below.

The choice of thermal parameters to be measured and the number of positions within the subsurface formation at which to perform measurements can and will vary depending on any one or more of a variety of factors including, but not limited to: available instrumentation, accessibility of formation to thermal sensors, unique characteristics of the formation, and any other relevant factor.

B) Correct Thermal Parameters

Referring again to FIG. 1, the method 100 may include removing background thermal effects to calculate corrected thermal parameters at step 104. The background thermal effects may include any thermal effects due to non-reactive material heat sources and sinks as described herein above including, but not limited to: geothermal heat generation and/or solar radiation at ground level.

In one aspect, each corrected thermal parameter may be calculated by subtracting a corresponding background thermal parameter from the measured thermal parameter from step 102 as described herein above. The corresponding background thermal parameter may be thermal parameter at a corresponding position within the subsurface obtained in the absence of a region including the reactive material. By subtracting the background thermal parameter from the measured thermal parameter, the resulting corrected thermal parameters represent the thermal parameters resulting exclusively from the energy changes generated by the exothermic or endothermic reactions of the reactive material within the subsurface formation.

In one aspect, the background thermal parameters may be obtained by conducting thermal parameter measurements as described herein above at a second region of the subsurface formation characterized by the absence of any regions including the reactive material contributing thermal effects to the thermal parameter measurements. In another aspect, the background thermal parameters correspond to the thermal parameters measured within or near the region including the reactive material based on a similarity in position relative to other features of the subsurface formation, including, but not limited to: proximity to ground level, distance above ground water, depth within ground water, and any other relevant measure of similarity.

In another aspect, the background thermal parameters may be calculated using a theoretical thermal model representing the distribution of thermal parameters within the subsurface formation in the absence of reactive materials. Any suitable theoretical model may be used including, but not limited to, applicable heat transfer models as outlined by Carslaw and Jaeger, *Conduction of heat in solids*. Oxford: Clarendon Press (1959). In this aspect, thermal parameters used as inputs to the theoretical thermal model may be obtained from measurements obtained at the subsurface formation including, but not limited to: ambient air temperature, soil temperature at ground level, and any other suitable thermal parameter.

C) Perform Energy Balance

Figure 2:
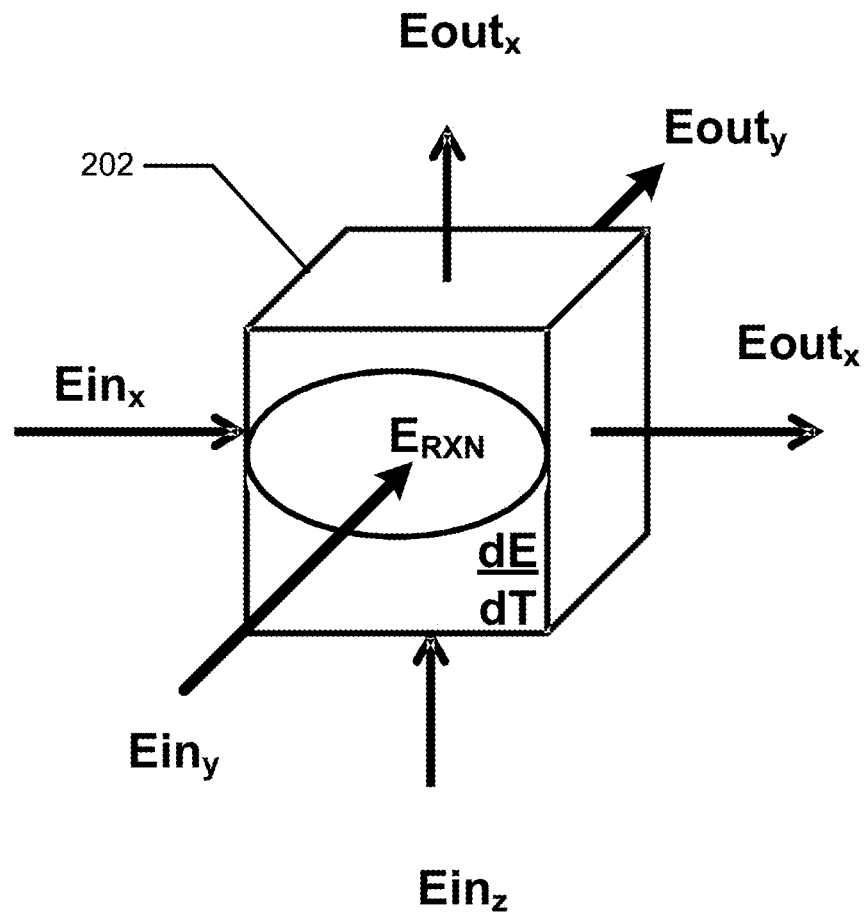
FIG. 2 is a schematic diagram illustrating the volume of the subsurface formation used to conduct the energy balance.

Referring again to FIG. 1, the method 100 may include performing an energy balance at step 106 to determine the energy generated by the exothermic or endothermic reaction of the reactive material within the subsurface formation. FIG. 2 schematically illustrates the energy balance volume 202 upon which the energy balance is performed, as well as the energy fluxes considered in the energy balance. The energy balance volume 202 may consist of the region including the reactive material of the subsurface formation both above and below the water table.

In one aspect, the energy balance as expressed as Equation 1 is applied to the energy balance volume illustrated in FIG. 2:

$$E_{in_z} + E_{in_x} + E_{in_y} - E_{out_z} - E_{out_x} - E_{out_y} + E_{RXN} \pm S = \frac{dE}{dt}; \quad (1)$$

where $E_{in_z}$ is the rate of conductive and convective energy input in the z direction, $E_{in_x}$ is the rate of conductive and convective energy input in the x direction, $E_{in_y}$ is the rate of conductive and convective energy input in the y direction, $E_{out_z}$ is the rate of conductive and convective energy output in the z direction, $E_{out_x}$ is the rate of conductive and convective energy output in the x direction, $E_{out_y}$ is the rate of conductive and convective energy output in the y direction, $E_{RXN}$ is the energy produced by the endothermic or exothermic reaction of the reactive material within the subsurface formation, S is a term that represents energy sources and/or sinks, and $$\frac{dE}{dt}$$

is the rate of change of energy within the energy balance volume 202.

By way of non-limiting example, the change in energy with time in the z direction may be due to conduction, convection of sensible heat by water and vapor, and convection of latent heat by vapor as described by the following equation:

$$E_{in_z} - E_{out_z} = E_{in_{z_{cond}}} - E_{out_{z_{cond}}} + E_{in_{z_{conv_w}}} - E_{out_{z_{conv_w}}} + E_{in_{z_{conv_v}}} - E_{out_{z_{conv_v}}} - E_{z_{conv_{v_{latent}}}} \quad (2)$$

where $$E_{in_{z_{cond}}} - E_{out_{z_{cond}}}$$

is the change in energy with time due to conduction, $$E_{in_{z_{conv_w}}} - E_{out_{z_{conv_w}}}$$

is the change in energy with time due to convection of sensible heat by water, $$E_{in_{z_{conv_v}}} - E_{out_{z_{conv_v}}}$$

is the change in energy with time due to convection of sensible heat by vapor, and $$E_{z_{conv_{v_{latent}}}}$$

is the change in energy with time due to convection of latent heat by vapor. The inflow and outflow due to conduction may be described by the following equations:

$$E_{in_{z_{cond}}} = -\kappa_1 \nabla T \Delta x \Delta y \quad (3)$$

$$E_{out_{z_{cond}}} = -\kappa_2 \nabla T \Delta x \Delta y \quad (4)$$

where $$E_{in_{z_{cond}}}$$

is the energy flow into the energy balance volume in the z direction due to conduction $$E_{out_{z_{cond}}}$$

is the energy flow out of the energy balance volume in the z direction due to conduction, $K_1$ is the thermal conductivity of the material above the energy balance volume 202, $K_2$ is the thermal conductivity of the material above the energy balance volume 202, $\nabla T_1$ is the temperature gradient above the energy balance volume, $\nabla T_2$ is the temperature gradient below the energy balance volume, and $\Delta x \Delta y$ is the cross-sectional area perpendicular to the z direction. The inflow and outflow due to convection of sensible heat by water are described by the following equations:

$$E_{in_{z_{conv_w}}} = \dot{m}_{win} c_w T_{win} \quad (5)$$

$$E_{out_{z_{conv_w}}} = \dot{m}_{wout} c_w T_{wout} \quad (6)$$

Where $$E_{in_{z_{conv_w}}}$$

is the energy flow into the energy balance volume in the z direction due to convection of sensible heat by water, $$E_{out_{z_{conv_w}}}$$

is the energy flow out of the energy balance volume in the z direction due to convection of sensible heat by water, $\dot{m}_w$ is the mass flow of water into/out of the energy balance volume, $c_w$ is the specific heat of the water, $T_w$ is the temperature of the water, and subscripts in and out represent the inflowing and outflowing water. Equations (5) and (6) can be combined to give the change in energy with time due to convection of sensible heat by water in the z direction:

$$E_{z_{conv_w}} = c_w (\dot{m}_{win} T_{win} - \dot{m}_{wout} T_{wout}) \quad (7)$$

The inflow and outflow due to convection of sensible heat by vapor are described by the following equations:

$$E_{in_{z_{conv_v}}} = \dot{m}_{vin} c_v T_{vin} \quad (8)$$

$$E_{out_{z_{conv_v}}} = -\dot{m}_{vout} c_v T_{vin} \quad (9)$$

Where $$E_{in_{z_{conv_v}}}$$

is the energy flow into the energy balance volume in the z direction due to convection of sensible heat by vapor, $$E_{out_{z_{conv_v}}}$$

is the energy flow out of the energy balance volume in the z direction due to convection of sensible heat by vapor, $\dot{m}_v$ is the mass flow of vapor into/out of the energy balance volume, $c_v$ is the specific heat of the vapor, and $T_v$ is the temperature of the vapor. Equations (8) and (9) can be combined to give the change in energy with time due to convection of sensible heat by vapor in the z direction:

$$E_{z_{conv_v}} c_v (\dot{m}_{vin} T_{vin} - \dot{m}_{vout} T_{vout}) \quad (10)$$

The inflow due to convection of latent heat by vapor is taken to be zero. The flow due to convection of latent heat by vapor in the z direction therefore is:

$$E_{z_{conv_{v_{latent}}}} = -L_0 q_v \Delta x \Delta y \quad (11)$$

where $L_0$ is the volumetric latent heat of vaporization of liquid water, and $q_v$ is the water vapor flux.

The change in energy within the volume 202 may be described by the following equation:

$$\frac{dE}{dt} = \Delta x \Delta y \Delta z C_m \frac{dT}{dt} \quad (12)$$

Where $\Delta z$ is the height of the energy balance volume and $C_m$ is the volumetric heat capacity of the energy balance volume.

Combining equations (3), (4), (7), (10), (11), and (12), the overall energy balance within the volume 202 may be expressed as:

$$(-\kappa_1 \nabla T_1 \Delta x \Delta y) - (-\kappa_2 \nabla T_2 \Delta x \Delta y) + \quad (13)$$
$$(c_w(\dot{m}_{win} T_{win} - \dot{m}_{wout} T_{wout})) + (-c_v(\dot{m}_{vin} T_{vin} - \dot{m}_{vout} T_{vout})) +$$
$$(L_0 q_v \Delta x \Delta y) + E_{RXN} \pm S = \Delta x \Delta y \Delta z C_m \frac{dT}{dt}$$

where $E_{RXN}$ is the rate of energy released to the surrounding environment during the endothermic or exothermic reaction of the reactive material within the subsurface formation. In an aspect, the rate of energy released to the surrounding environment may be converted to a rate of change in the amount of reactive material within the subsurface formation using the change in enthalpy associated with the endothermic or exothermic reaction as described herein below.

In another aspect, the energy balance may be performed using corrected thermal parameters calculated by removing the background thermal effects from the measured thermal effects as described herein above. In this other aspect, only the energy source due to the endothermic or exothermic reaction of the reactive material within the subsurface formation is of interest for this model. To separate the heat flux due to endothermic or exothermic reaction of the reactive material from the heat fluxes due to other factors including, but not limited to surface heating and cooling, the geothermal gradient, and lateral translation of heat, a background subtraction method may be utilized. The subsurface thermal parameters at a background location that does not have an energy source due to the endothermic or exothermic reaction of the reactive material may be subtracted from the thermal parameters measured at a region including the reactive material of the subsurface formation to calculate the thermal parameters due to the endothermic or exothermic reaction of the reactive material. These corrected thermal parameters may then be used in the energy balance to determine the heat produced from the endothermic or exothermic reaction of the reactive material.

Within the region including the reactive material, the simplified energy balance is represented by the following equation:

$$E_{in_{Impact}} - E_{out_{Impact}} + E_{RXN} \pm S = \frac{dE}{dt_{Imact}} \quad (14)$$

where subscript Impact indicates the region including the reactive material. However, at the background location, there is not an energy source due to the endothermic or exothermic reaction of the reactive material, so the simplified energy balance is:

$$E_{in_{Bkg}} - E_{out_{Bkg}} \pm S = \frac{dE}{dt_{Bkg}} \quad (15)$$

where subscript Bkg indicates the background location. The term S represents the sources and sinks due to other factors including, but not limited to surface heating and cooling, the geothermal gradient, and the lateral movement of energy into or out of the area of interest. Assuming that S is the same at both the impacted and background location, equation (14) may be solved for S, which is then plugged in to equation (15) and solved for $E_{RXN}$ to obtain:

$$E_{RXN} = \quad (16)$$
$$-(E_{in_{Impact}} - E_{in_{Bkg}}) + (E_{out_{Impact}} - E_{out_{Bkg}}) + \left(\frac{dE}{dt_{Imact}} - \frac{dE}{dt_{Bkg}}\right)$$

Because the soil properties are assumed to be the same as the reactive material and background locations, the energy difference between each term in equation 16 is due solely to the temperature difference between the impacted and background location. Thus, the temperature at the background location at each depth or other corresponding position as described herein above may be subtracted from the temperature measured at the reactive material location to calculate the corrected temperature. This corrected temperature may then be substituted into the overall energy balance equation (equation (13)) to eliminate the unknown term S. The new energy balance becomes:

$$(-\kappa_1 \nabla T_{c1} \Delta x \Delta y) - (-\kappa_2 \nabla T_{c2} \Delta x \Delta y) + \quad (17)$$
$$(c_w(\dot{m}_{win}T_{cwin} - \dot{m}_{wout}T_{cwout})) + (-c_v(\dot{m}_{vin}T_{cvin} - \dot{m}_{vout}T_{cvout})) +$$
$$(L_0 q_v \Delta x \Delta y) + E_{RXN} \pm S = \Delta x \Delta y \Delta z C_m \frac{dT_c}{dt}$$

where $T_c$ is the corrected temperature.

In an additional aspect, the rate of energy released to the surrounding environment ($E_{RXN}$) due solely to the endothermic or exothermic reaction of the reactive material within the subsurface formation as calculated by Equation 17 may be converted to a rate of change in the amount of reactive material within the subsurface formation using the change in enthalpy associated with the endothermic or exothermic reaction as described herein below.

D) Convert Rate of Energy Change to Rate of Change in Amount of Reactive Material Referring again to FIG. 1, $E_{RXN}$, the rate of energy released to the surrounding environment that is associated with the endothermic or exothermic reaction of the reactive material within the subsurface formation, was calculated previously at step 106 using the energy balance equation in terms of the corrected thermal parameters (Equation 17). At step 108, $E_{RXN}$ may be converted to a rate of change of change in mass of the reactive material within the subsurface formation according to Equation 18.

$$LossRate = \frac{-E_{RXN}}{\Delta H_r} \frac{MW_{RM}}{\rho_{RM}} \quad (18)$$

where $\Delta H_r$ is the enthalpy released during the endothermic or exothermic reaction of the reactive material, $MW_{RM}$ is the molecular weight of the reactive material, and $\rho_{RM}$ is the density of the reactive material.

In one aspect, if the reactive material is an inorganic compound undergoing a single endothermic or exothermic reaction within the subsurface formation, $\Delta H_r$ may be retrieved from any reference known in the art that documents the thermodynamic parameters, including $\Delta H_r$, associated with the single endothermic or exothermic reaction.

In another aspect, if the reactive material is undergoing microbial biodegradation, the involvement of the microbes invokes additional considerations with respect to the appropriate value for the enthalpy change $\Delta H_r$ to use during the conversion of the rate of energy change to the rate of change in the amount of reactive material within the subsurface formation. Microbial biodegradation may involve multiple reactions or pathways which may be combined as described herein below to yield enthalpy change $\Delta H_r$ for the overall microbial degradation. In addition, the energy produced by the biodegradation reaction may be divided into a portion released as heat to the surrounding environment and a portion directed to growth and reproduction of the microbes performing the biodegradation. In this other aspect, the stoichiometric change in enthalpy, used herein to describe the total amount of energy change resulting from the biodegradation reaction, may be reduced by an energy transfer efficiency described in additional detail herein below.

In various other aspects, microbially mediated biodegradation reactions may involve multiple pathways in which each pathway is associated with a change in free energy, enthalpy, and entropy. Non-limiting examples of chemical pathways associated with microbially mediated biodegradation include: aerobic respiration, denitrification, manganese reduction, iron reduction, sulfate reduction, nitrate reduction, methanogenesis, or any combination thereof. To determine the thermodynamic parameters describing the overall biodegradation of the reactive material, the changes for each pathway may be combined to calculate the changes in free energy, enthalpy, and entropy for the overall biodegradation.

In various other aspects, the stoichiometric change in enthalpy used in Equation 22 to calculate the loss rate of the reactive material within the subsurface formation may be reduced to account for diversion of a portion of the energy yield to microbial growth and reproduction. Without being limited to any particular example, a wide range of energy transfer efficiencies exists. In various additional aspects, the energy transfer efficiency may be determined using any one or more evaluation methods including, but not limited to: a field study to determine the overall energy yield, The actual energy transfer efficiency of a reaction depends on the microorganisms, substrates, and environment at a particular location. Due to this variability, a range of efficiencies may be considered when using the method.

In one aspect, any value of energy transfer efficiency E may be used without limitation. In various aspects, the energy transfer efficiency E may be estimated or calculated from experimental microbial growth yields, field measurements of microbial growth yields, estimated using thermodynamics based on electron and energy balances, and/or calibrated using an independent measure of energy flux including, but not limited to $CO_2$ traps as a calibration standard. In various other aspects, the energy transfer efficiency E may range from about 0.1 to about 0.9. In additional aspects, the energy transfer efficiency E may range from about 0.1 to about 0.3, from about 0.2 to about 0.4, from about 0.3 to about 0.5, from about 0.4 to about 0.6, from about 0.5 to about 0.7, from about 0.6 to about 0.8, and from about 0.7 to about 0.9.

Without being limited to any particular example, a wide range of energy transfer efficiencies exists. The actual efficiency of a reaction depends on the microorganisms, substrates, and environment at a particular location. Due to this variability, a range of efficiencies may be considered when using the method.

II. Subsurface Thermal Monitoring System

Figure 3:
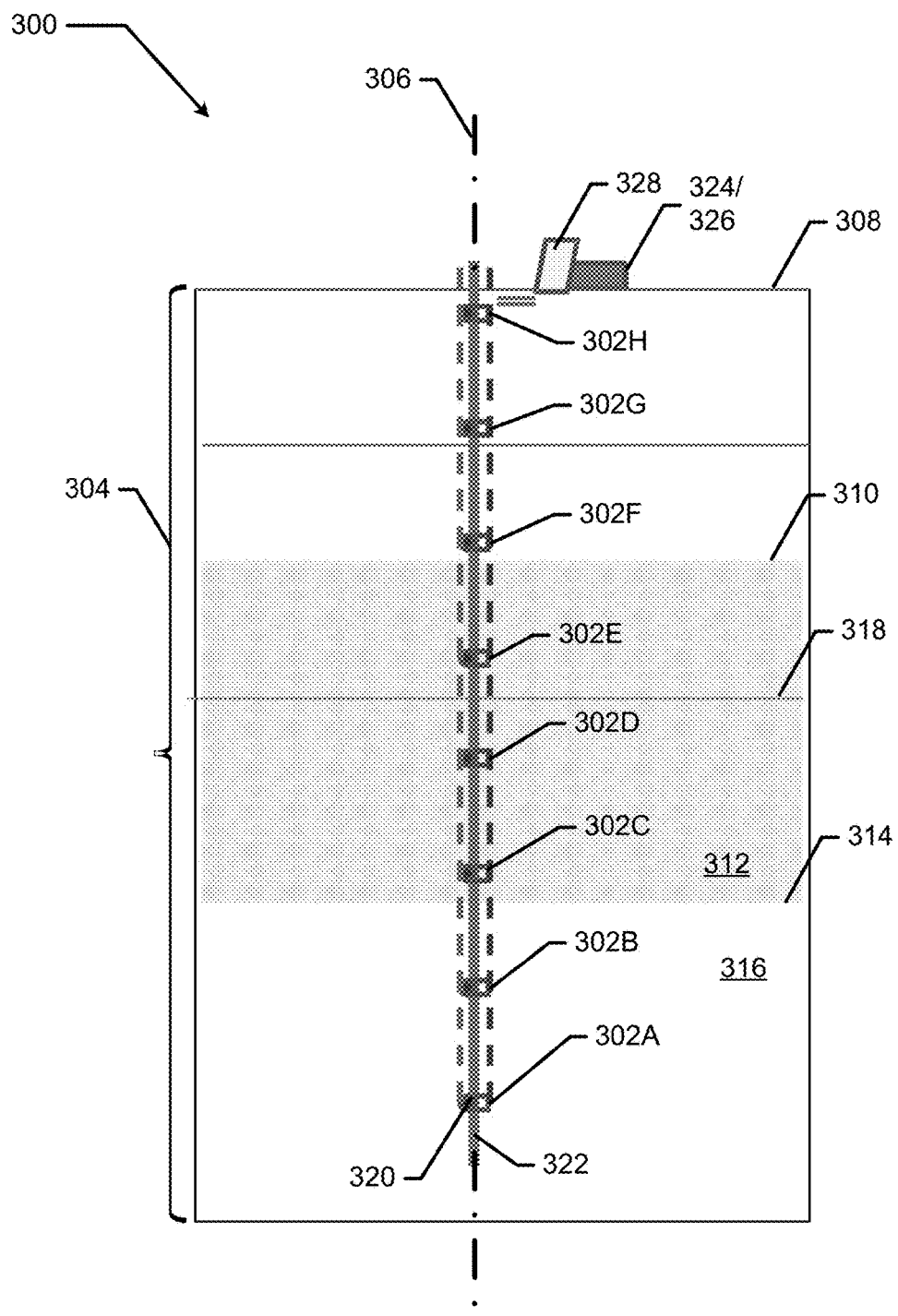
FIG. 3 is a schematic representation of a subsurface thermal monitoring system installed within a subsurface formation.

In an aspect, a subsurface thermal monitoring system may be used to monitor the at least one thermal parameter at one or more positions within the subsurface formation. FIG. 3 is a schematic representation of a subsurface thermal monitoring system 300 installed within a subsurface formation in one aspect. The system, 300 may include a plurality of temperature sensors 302 including, but not limited to temperature sensors 302A, 302B, 302C, 302D, 302E, 302F, 302G, and 302H as illustrated in FIG. 3. In various aspects, plurality of temperature sensors 302 may be situated at any position relative to one another within the subsurface formation 304 without limitation. In various aspects, the plurality of temperature sensors 302 may be arranged to monitor one or more temperature gradients in one dimension, as illustrated in FIG. 3, in two dimensions, and/or in three dimensions. As described herein above, the temperature sensors 302A, 302B, 302C, 302D, 302E, 302F, 302G, and 302H may be situated along a vertical transect 306 extending vertically downward from ground level 308 to a distance below the upper extent 310 of the reactive materials 312 to below the lower extent 314 of the reactive materials 312 and/or below the upper extent 318 of the water table 316 within the subsurface formation 304.

Referring again to FIG. 3, the plurality of temperature sensors 302 may include at least two temperature sensors 302F, 302G, and/or 302F situated above the upper extent 310 of the reactive materials 312 to provide sufficient information to calculate a thermal gradient above the region of reactive materials 312 as described herein above. In another aspect, the plurality of temperature sensors 302 may include at least two temperature sensors 302A and 302B situated below the lower extent 314 of the reactive materials 312 to provide sufficient information to calculate a thermal gradient below the region of reactive materials 312. In yet another aspect, the plurality of temperature sensors 302 may include at least one temperature sensor 302C, 302D, and/or 302E situated within the reactive materials 312 to provide sufficient information to calculate the rate of change of temperature within the reactive materials 312 as described herein above.

Any known suitable temperature sensor may be used in the system 300 without limitation including, but not limited to: thermocouples, thermistors, resistance temperature detectors, silicon bandgap temperature detectors, and any other suitable temperature sensor known in the art. In another aspect, the system 300 may include one or more thermal gradient sensors (not shown) including, but not limited to, a thermal gradient plate such as a Peltier cooler. In this other aspect, the one or more thermal gradient sensors may be situated above the upper extent 310 and/or below the lower extent 314 of the reactive materials 312.

The device 300 may further include one or more additional sensors to measure additional data that may be used to determine thermal fluxes within the subsurface formation 304. In one aspect, a water level sensor (not shown) may be included in the system 300 to monitor the vertical movement of the water levels within the subsurface formation 304 to help determine vertical convective energy flux due to vertical water movement as described herein above. In another aspect, one or more gas ports 320 may be included in the system to monitor CO2 or other gas by-products produced by reactions of the reactive materials within the subsurface formation 304.

In other aspects, the system 300 may further include a support 322 to which the temperature sensors 302 and/or additional sensors may be attached and maintained in a desired vertical position relative to ground level 308 of the subsurface formation 304. In various aspects, the support may be an elongate, stiff member that may be introduced into a monitor well or other channel reaching down a suitable distance into the subsurface formation. In addition, the support 322 may be sufficiently flexible to be wound on a spool for transport and delivery at a monitor site. In another aspect, the diameter of the support may be sufficiently small to ensure compatibility with existing deep drilling systems. In one aspect, the support may be a formed from PVC tubing with an outer diameter of about ⅜".

In another aspect, the system 300 my further include a data logger 324 operatively coupled to the temperature sensors 302 and/or additional sensors. In this aspect, the data logger may receive and store a plurality of readings from the temperature sensors 302 and/or additional sensors over a period of time and may additionally transmit or download the stored data via any one or more known means including, but not limited to direct downloading of the stored data to a storage device such as a jump drive, portable hard drive, or other suitable storage device, transmittal of the data via telephone lines, over an Internet network, over a wireless data network, or via any other known data communication means. In yet another aspect, the system 300 may further include a data transmittal device 326 including, but not limited to a radio transmitter (not shown) and/or a digital cellular modem operatively connected to the data logger 324. Any known suitable data transmittal device may be incorporated into the system 300 without limitation.

In another additional aspect, the system 300 may further include a power source 328 operatively connected to the temperature sensors 302 and/or additional sensors, the data logger 324, and the data transmittal device 326. Any known power source 328 may be used in the system 300 without limitation including, but not limited to a solar panel, a battery, a power line, and any other suitable power source.

EXAMPLES

The following examples illustrate aspects of the disclosure.

Figure 4:
FIG. 4 is a diagram illustrating the locations of thermal measurements used to monitor LNAPL degradation.

Example 1. Monitoring of Rate of Change of LNAPL Reactive Materials Within a Subsurface Formation Using Subsurface Temperature Measurements To demonstrate the monitoring of the rate of change of a reactive material within a subsurface formation using the methods described herein above, the following experiments were conducted. Five 37-foot long PVC rods with eight attached thermocouples similar to the corresponding elements of the subsurface thermal monitoring system 300 illustrated in FIG. 4 were installed within a subsurface formation known to contain LNAPL regions at the locations N1, N2, N3, N4, and B1 as illustrated in FIG. 4. These subsurface assemblies of thermocouples, referred to as "sticks", were located in an east-west transect across the northern edge of the site. The first three locations in the transect (N1-N3) were known to contain LNAPL regions. The southernmost location (B1) was considered to be a background location, where subsurface temperatures are not affected by LNAPL.

Each of the sticks was installed using a direct push drilling method. Holes were advanced to a depth of 37 feet bgs (below ground surface) and each stick was placed inside the hollow drive pipe. Subsequently, the drive pipe was pulled back leaving the stick in the subsurface formation. Below the water table, the subsurface formation was allowed to collapse onto the stick. Above the water table, a coarse sand was added through the hollow drive pipe to fill the annular space between the stick and the subsurface formation.

The temperatures at each of the stick locations were automatically recorded at 0.5, 1, 10, 12, 19, 27, 35, and 37 feet below grade at each location. The location of the thermocouples was configured to resolving heat fluxes in Watt/m2 at grade, above the LNAPL body, and below the LNAPL body. Thermocouple measurements in the LNAPL body (19 and 27 feet) were used to resolve the change in temperature inside the LNAPL body through time. Data was remotely downloaded from the data logger for analysis via a digital cellular modem.

Figure 5:
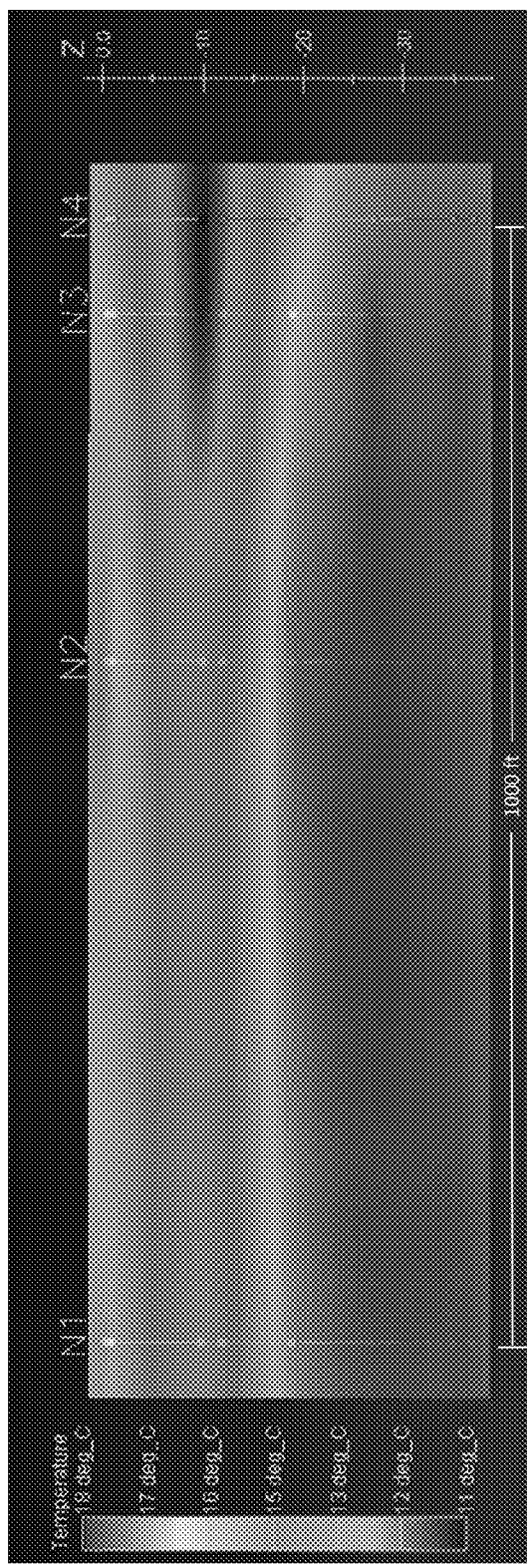
FIG. 5 is a color temperature contour summarizing the temperature gradients calculated using the thermocouple measurements.
Figure 6:
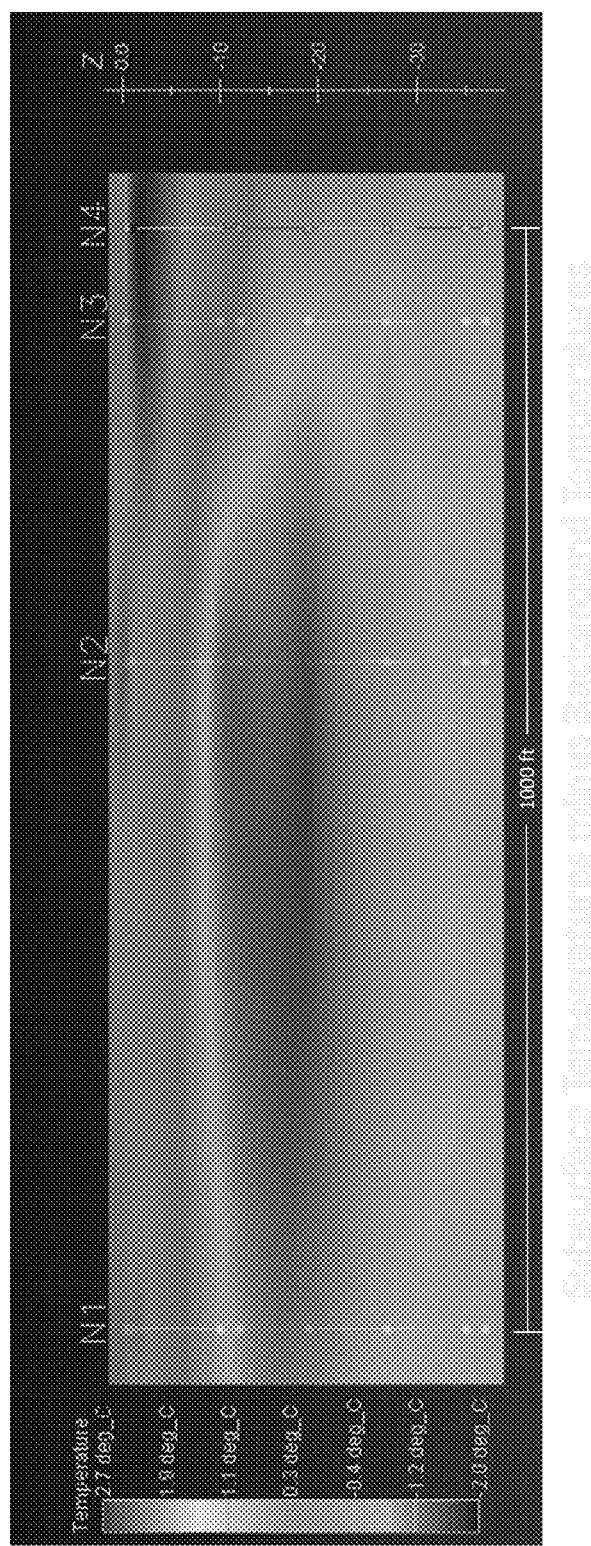
FIG. 6 is a color temperature contour summarizing the corrected temperature gradients calculated by subtracting the background temperatures from each of the temperatures measured at each of the other locations.
Figure 7A:
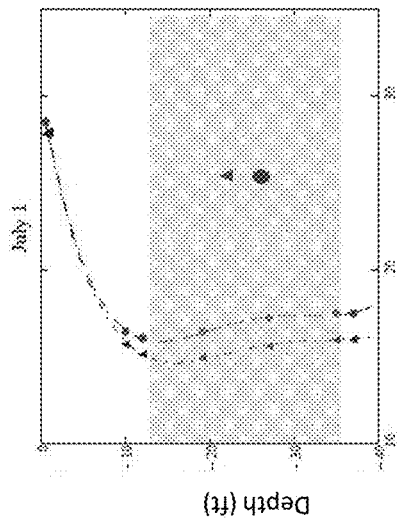
FIGS. 7A, 7B, 7C, 7D, 7E, and 7F are graphs summarizing the temperature profiles at site N1, which contains LNAPL bodies, as well as at site B1 (Background) which does not include any LNAPL deposits, measured at six different dates between May 1 and October 1.
Figure 7B:
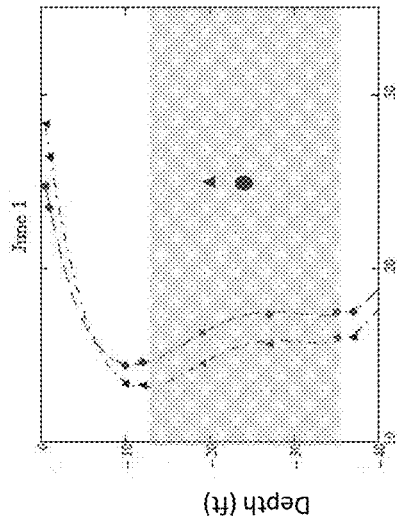
Figure 7C:
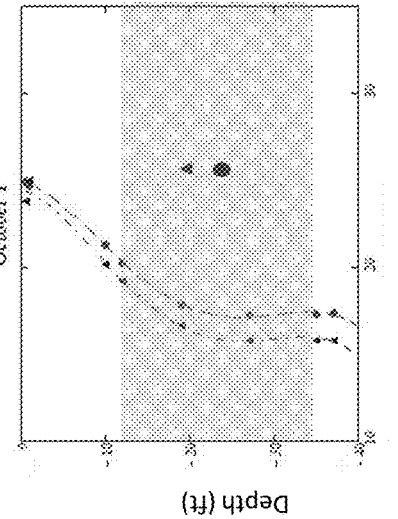
Figure 7D:
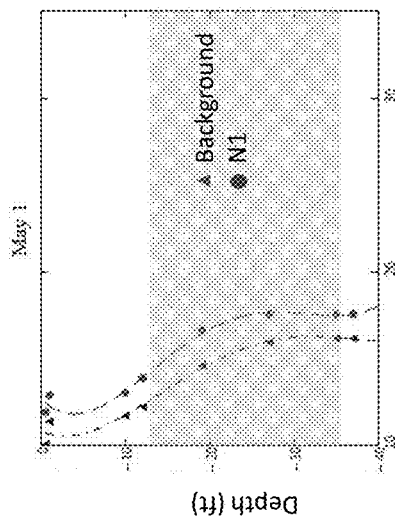
Figure 7E:
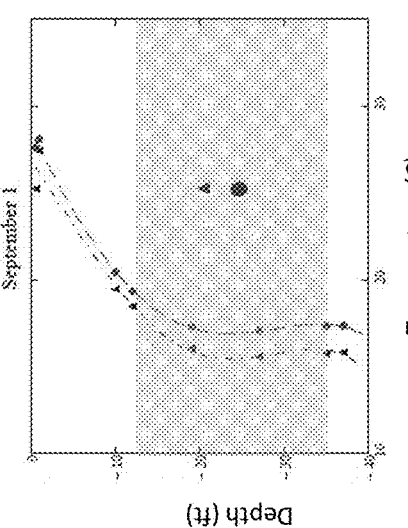
Figure 7F:
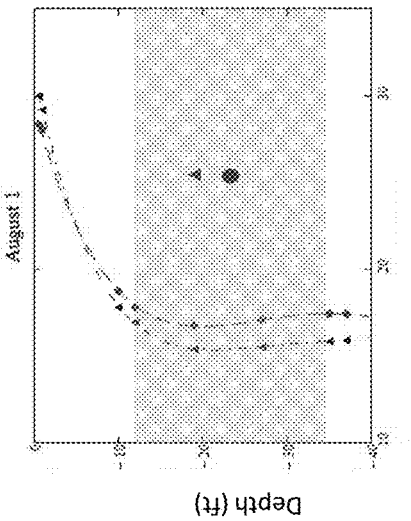

FIG. 5 is a color temperature contour summarizing the temperature gradients calculated using the thermocouple measurements obtained as described herein above. The thermocouple installation depths are overlaid for reference. The background thermocouples were installed at the same depth as the thermocouples in the LNAPL transects. The temperatures summarized in FIG. 5 include the effects of both LNAPL degradation and other additional background sources. FIG. 6 is another color temperature contour summarizing the corrected temperature gradients calculated by subtracting the background temperatures obtained at location B1 from each of the temperatures measured at each of the other locations. Consequently, the corrected temperatures summarized in FIG. 6 reflect the heat of reaction associated solely with biodegradation-associated heat production.

FIGS. 7A, 7B, 7C, 7D, 7E, and 7F are graphs summarizing the temperature profiles at site N1, which contains LNAPL bodies, as well as at site B1 (Background) which does not include any LNAPL deposits, measured at six different dates between May 1 and October 1. Typically, the temperatures measured at the N1 site were 1-2 degrees C. higher, as compared to the temperatures measured at the background (B1) location. This observation is consistent with heat generated in compost piles and landfills through degradation of organic compounds.

An energy balance was performed on the LNAPL site (N1) to resolve the energy fluxes into and out of the impacted area in W/m2 using the methods described herein above. Energy fluxes due to conduction, convection of sensible heat by water, convection of sensible heat by vapor, and convection of latent heat by vapor were considered to determine the energy produced by the biodegradation of LNAPL. The resulting rate of change of energy within the LNAPL bodies at the N1 site was converted to a loss rate using the methods described herein above. It was assumed that the biodegradation of LNAPL was 60% efficient, indicating that 60% of the energy contained in the LNAPL was used as an energy source for microorganisms and the remaining 40% of the energy was lost as heat ($Eff_{Micro}=0.4$). The assumed reaction efficiency falls in the range of values reported in the literature.

Figure 8:
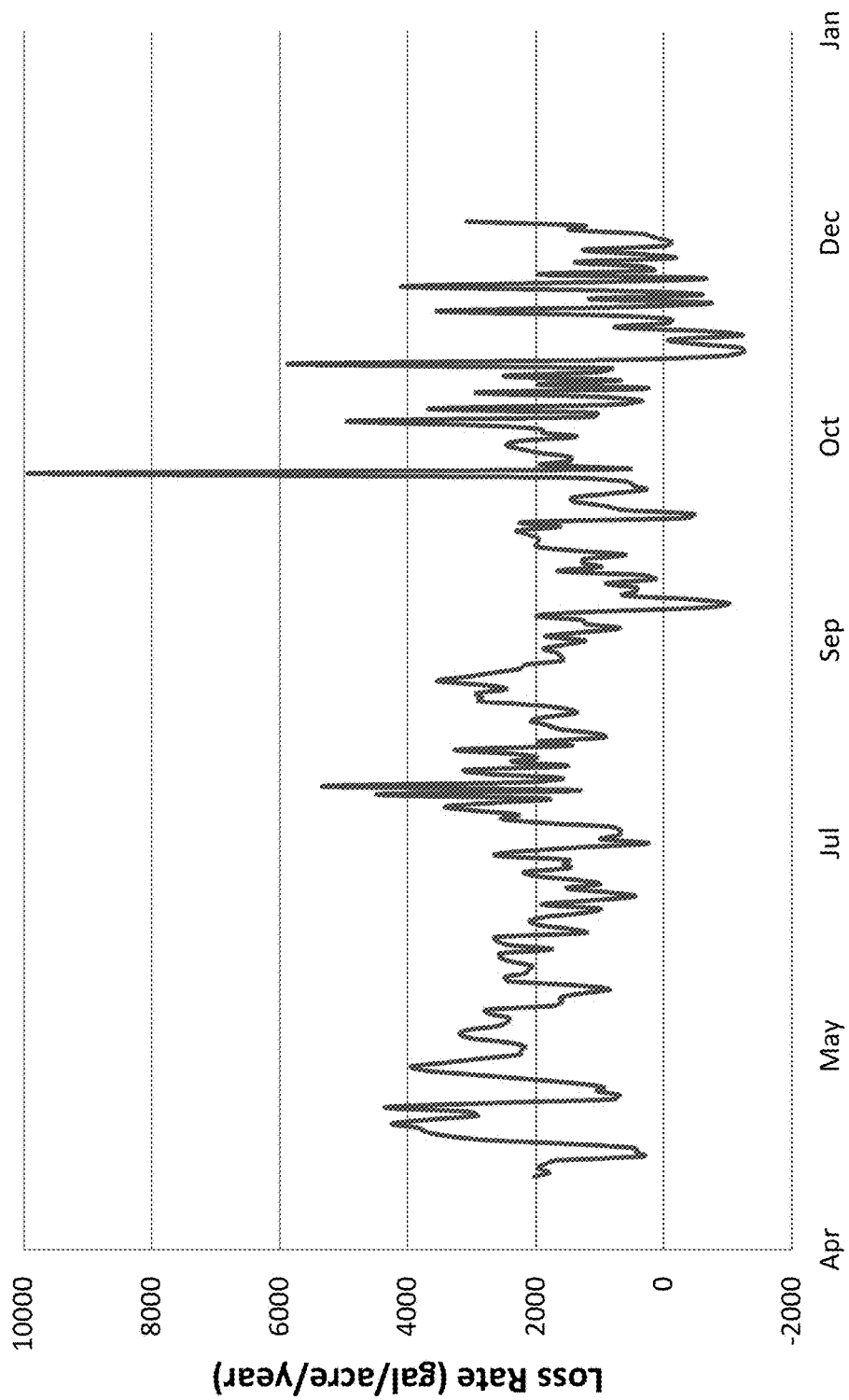
FIG. 8 is a graph summarizing the daily LNAPL loss rates in gallons of LNAPL per acre per year.
Figure 9:
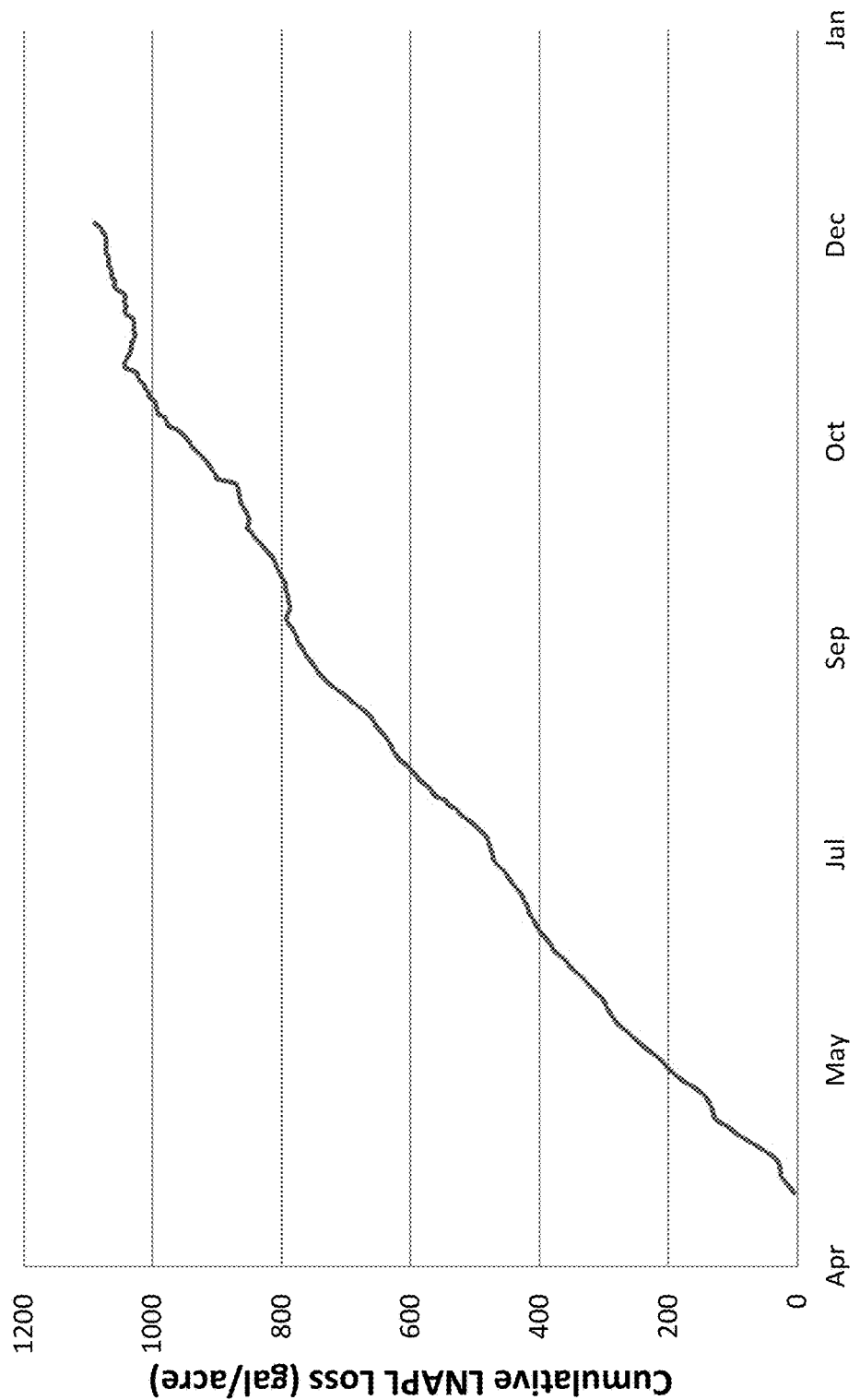
FIG. 9 is a graph summarizing the integrated LNAPL losses in gallons per acre for the period (April 14 to December 14).

FIG. 8 summarizes the daily LNAPL loss rates in gallons of LNAPL per acre per year. FIG. 9 summarizes the integrated LNAPL losses in gallons per acre for the period (April 14 to December 14). The values shown in FIG. 8 and FIG. 9 are based on: averaged background corrected temperature data from N1, N2, and N3;
Mole_Weight$_{LNAPL}$=142 gm/mole (decane); Density$_{LNAPL}$=0.8 gm/cm3; $\Delta H_{Combustion}$=Joules/mole; Eff$_{Micro}$=0.4

The mean biodegradation rate of LNAPL over the period of this experiment was 1770 gallons per acre per year. Applying this rate to the entire LNAPL area (19 acres) for a ten year period suggests an overall LNAPL loss of 340,000 gallons of LNAPL. The daily LNAPL loss rate shows a slight seasonal variation, with lower LNAPL losses in the winter and higher LNAPL losses in the summer.

The results of this experiment demonstrated that the rate of degradation of a subsurface reactive material, in this instance LNAPL, could be monitored using the devices and methods described herein above.

It should be understood from the foregoing that, while particular aspects have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for thermal monitoring within a subsurface formation to determine a rate of change of the amount of a subject organic material being degraded by microbial activity and to develop a site remediation, the method comprising:
monitoring at least one thermal parameter at one or more positions within the subsurface formation using one or more sensors, the at least one thermal parameter comprising at least one of: a temperature or a thermal flux;
logging the at least one thermal parameter in a digital data storage device, the data storage device operable to receive and store the at least one thermal parameter;
transmitting to a processor the at least one thermal parameter from the data storage device using a data transmittal device and yielding transmitted data;
calculating with said processor at least one corrected thermal parameter based on the transmitted data by subtracting the effects of non-subject material-related energy sources or sinks from the one thermal parameter, wherein the non-subject material-related energy sources or sinks includes an energy source or sink that reflects a background temperature;
calculating with said processor one or more energy fluxes using the at least one corrected thermal parameter according to a plurality of energy transfer rules;
calculating with said processor a net rate of energy change produced by an endothermic reaction or an exothermic reaction of the organic material within the subsurface formation by combining the one or more energy fluxes;
converting with said processor the net rate of energy change into a rate of change of an amount of the organic material according to a reaction rule representing the endothermic reaction or the exothermic reaction of the organic material within the subsurface formation;
displaying on a digital screen a visual representation of the rate of change of the amount of the organic material; and
creating a site remedy for remediation of the subsurface formation based on the rate of change of the amount of the organic material determined by the thermal measurements.

2. The method of claim 1, further comprising monitoring the rate of change in the amount of the organic material and reporting a new release of the organic material into the formation if the rate of change in the amount of the organic material exceeds a threshold value.

3. The method of claim 1, further comprising monitoring the rate of change in the amount of the organic material after initiation of a site remedy to monitor the effectiveness of the site remedy.

4. The method of claim 1, further comprising integrating the rate of change in the amount of the organic material to calculate a cumulative change in the amount of the organic material within the subsurface formation.

5. The method of claim 1, wherein at least two positions are monitored and the one or more positions are separated by a vertical separation distance, a horizontal separation distance, or any combination thereof.

6. The method of claim 1, wherein the non-subject material-related energy sources or sinks reflect a background temperature sensed from a sensor at the subsurface formation.

7. The method of claim 1, wherein each of the at least one energy source or sink that reflects a background temperature results in a representation of a thermal parameter within a subject organic material-free region from the subsurface formation matched to one position of one thermal parameter.

8. The method of claim 1, wherein the at least one energy source or sink that reflects a background temperature is obtained by:
estimating the at least one background temperature using a model of subsurface temperatures.

9. The method of claim 1, wherein the plurality of energy transfer rules comprises:
a heating rule used to calculate the rate of change of energy within a region including the organic material of the subsurface formation associated with temperature changes;
a sensible heat conduction rule used to calculate a conductive heat flux from the subsurface formation via an amount of substrate adjacent to the region including the organic material of the subsurface formation;
a sensible heat convection rule used to calculate convective heat flux via at least one of water or water vapor flowing through the subsurface formation;
a latent heat transfer rule used to calculate a latent heat flux from the subsurface formation via a movement of water vapor through the subsurface formation; or
any combination thereof.

10. The method of claim 1, wherein the reaction rule used to convert the net rate of energy change into the rate of change of the amount of the organic material comprises dividing the net rate of energy change by an enthalpy change of the degradation reaction of the organic material within the subsurface formation.

11. A method for thermal monitoring and site remediation within a subsurface formation to determine the unknown rate of change of an amount of a subject organic material being degraded by unpredictable subsurface exothermic or endothermic reactions, the rate of change being used for incorporation into a site remediation strategy, the method comprising:
monitoring a plurality of site temperatures captured using one or more sensors from a plurality of positions along a vertical transect passing through the subsurface formation
logging the plurality of site temperatures in a digital data storage device, the data storage device operable to receive and store the plurality of site temperatures;
transmitting to a processor the plurality of site temperatures from the data storage device using a digital data transmittal device and yielding transmitted data;
calculating with said processor a plurality of corrected temperatures, the plurality of corrected temperatures calculated by subtracting a plurality of background temperatures from the plurality of site temperatures at each of the vertical positions, wherein each of the plurality of background temperatures comprising a representation of a temperature from a vertical position within subject organic material-free region;
calculating with said processor a net rate of energy change produced by an endothermic reaction or an exothermic reaction of the organic material within the subsurface formation by adding one or more energy fluxes, the one or more energy fluxes comprising:
a rate of change of energy within the region including the organic material of the subsurface formation associated with temperature changes;
a conductive heat flux from the region including the organic material of the subsurface formation via an amount of substrate adjacent to the region including the organic material; and a convective heat flux via at least one of water or water vapor flowing through the region including the organic material of the subsurface formation;

calculating with said processor a rate of change of an amount of the organic material within the subsurface formation, the rate of change of the amount of the organic material calculated by dividing the net rate of energy change by a change in enthalpy associated with the exothermic or endothermic degradation reaction of the organic material within the subsurface formation;

displaying a visual representation of the rate of change of an amount of the organic material, the visual representation being a graph summarizing a plurality of daily loss rates based on the rate of change of the amount of the organic material; and using rate of change of the organic material to develop a site remedial strategy for removal of the organic material from the subsurface formation based on achieving site-specific organic material amount goals.

12. The method of claim 11, wherein the plurality of background temperatures are obtained by:

measuring the background temperatures with a sensor along a second vertical transect within a subject organic material-free region of the subsurface formation situated near the first vertical transect; or estimating the background temperatures using a model of subsurface temperatures.

13. The method of claim 11, further comprising:

calculating the rate of change of energy associated with temperature changes within the region including the organic material subsurface formation by multiplying a rate of change of the corrected temperature at one position by a vertical thickness of the region including the organic material subsurface formation and by a volumetric heat capacity representative of the soil within the subsurface formation.

14. The method of claim 11, further comprising calculating the vertical conductive heat flux using the corrected temperatures by:

calculating an upper thermal gradient by dividing a first differential between the corrected temperatures between two of the plurality of positions by a first vertical separation distance between the two positions;

calculating an upper conductive heat flux by multiplying the upper thermal gradient by a first thermal conductivity representative of the soil between those two positions;

calculating a lower thermal gradient by dividing a second differential between the corrected temperatures at two additional positions by a second vertical separation distance between those positions; and calculating a lower conductive heat flux by multiplying the lower thermal gradient by a second thermal conductivity representative of the soil between the two additional positions.

15. The method of claim 11, further comprising monitoring groundwater levels to measure at least one of a vertical water flux or a horizontal water flux flowing through the subsurface formation.

16. The method of claim 15, further comprising calculating a vertical convective heat flux by multiplying a third differential between the corrected temperatures at at least two positions by the vertical water flux and by the volumetric heat capacity of water.

17. The method of claim 11, wherein:

the conductive heat flux comprising: a vertical conductive heat flux, a horizontal conductive heat flux, a lateral conductive heat flux mutually perpendicular to the vertical and horizontal conductive heat fluxes, and any combination thereof; and the convective heat flux comprises: a vertical convective heat flux, a horizontal convective heat flux, a lateral convective heat flux mutually perpendicular to the vertical and horizontal convective heat fluxes, and any combination thereof.

18. The method of claim 11, wherein:

the subject organic material comprises at least one hydrocarbon; and the endothermic or exothermic reaction is a microbial biodegradation of the at least one hydrocarbon.

19. The method of claim 18, wherein the change in enthalpy is calculated by:

calculating a stoichiometric change in entropy, a stoichiometric change in enthalpy and a stoichiometric change in free energy for one or more reduction-oxidation reactions associated with the microbial biodegradation; and calculating the change in enthalpy, wherein the change in enthalpy comprises the proportion of the stoichiometric change in enthalpy released as heat during the microbial biodegradation.

20. The method of claim 19, wherein the one or more reduction-oxidation reactions associated with the microbial biodegradation comprise: aerobic respiration, denitrification, manganese reduction, iron reduction, sulfate reduction, nitrate reduction, methanogenesis, methane oxidation, or any combination thereof.

* * * * *

UNITED STATES PATENT AND TRADEMARK OFFICE
CERTIFICATE OF CORRECTION

PATENT NO. : 10,094,719 B2
APPLICATION NO. : 14/625570
DATED : October 9, 2018
INVENTOR(S) : Thomas C. Sale et al.

Page 1 of 1

It is certified that error appears in the above-identified patent and that said Letters Patent is hereby corrected as shown below:

In the Specification

Column 22 Claim 16, Line 2 Delete "third"

Signed and Sealed this
Fifth Day of February, 2019

Andrei Iancu
*Director of the United States Patent and Trademark Office*